(12) United States Patent
Sanzari

(10) Patent No.: US 9,829,307 B2
(45) Date of Patent: *Nov. 28, 2017

(54) SILICON BASED PRESSURE AND ACCELERATION OPTICAL INTERFEROMETRIC SENSORS WITH HOUSING ASSEMBLY

(71) Applicant: Kulite Semiconductor Products, Inc., Leonia, NJ (US)

(72) Inventor: Martin A. Sanzari, Wayne, NJ (US)

(73) Assignee: Kulite Semiconductor Products, Inc., Leonia, NJ (US)

(*) Notice: Subject to any disclaimer, the term of this patent is extended or adjusted under 35 U.S.C. 154(b) by 346 days.

This patent is subject to a terminal disclaimer.

(21) Appl. No.: 14/664,187

(22) Filed: Mar. 20, 2015

(65) Prior Publication Data

US 2016/0273904 A1    Sep. 22, 2016

(51) Int. Cl.
*G01B 9/02*    (2006.01)
*G01L 9/00*    (2006.01)
*G01P 15/093*    (2006.01)

(52) U.S. Cl.
CPC ............. *G01B 9/0207* (2013.01); *G01L 9/00* (2013.01); *G01L 9/0044* (2013.01); *G01L 9/0048* (2013.01); *G01L 9/0079* (2013.01); *G01P 15/093* (2013.01); *G01B 2290/25* (2013.01)

(58) Field of Classification Search
CPC ............. G01B 9/0207; G01B 9/02071; G01B 9/02075; G01B 2290/25; G02B 6/29358; G02B 6/29359; G01L 9/0024; G01L 9/0079; G01L 9/0044; G01L 9/0048
See application file for complete search history.

(56) References Cited

U.S. PATENT DOCUMENTS

| | | | | |
|---|---|---|---|---|
| 5,128,537 A * | 7/1992 | Halg | ........... | G01L 9/0079 250/231.19 |
| 5,657,405 A * | 8/1997 | Fujiwara | ........... | G01D 5/268 356/225 |
| 5,844,667 A * | 12/1998 | Maron | ........... | G01L 9/0076 250/227.18 |
| 7,458,273 B2 * | 12/2008 | Skinner | ........... | E21B 47/06 73/716 |

(Continued)

*Primary Examiner* — Michael A Lyons
(74) *Attorney, Agent, or Firm* — Troutman Sanders LLP; James E. Schutz; Mark Lehi Jones

(57) ABSTRACT

A optical sensor assembly is disclosed that includes a sensor diaphragm configured to deflect responsive to an applied stimulus. The sensor assembly includes a first Extrinsic Fabry-Perot Interferometer (EFPI) having a first optical cavity in communication with at least a portion of the sensor diaphragm, the first EFPI is configured to interact with light to produce a combined measurement light signal and a first common-mode light signal, the measurement light signal corresponding to the applied stimulus. The sensor assembly also includes a second EFPI having a second optical cavity, the second EFPI is configured to interact with light to produce a second common mode light signal for error correction. The sensor assembly may further include a sensing optical fiber in communication with the first EFPI; a reference optical fiber in communication with the second EFPI; and a glass header configured to support the sensing optical fiber and the reference optical fiber.

20 Claims, 10 Drawing Sheets

(56) References Cited

U.S. PATENT DOCUMENTS

| | | | |
|---|---|---|---|
| 7,623,245 B2 * | 11/2009 | Kinugasa | G01L 9/0077 356/478 |
| 2003/0117630 A1 * | 6/2003 | Youngner | G01L 9/002 356/480 |
| 2016/0202135 A1 * | 7/2016 | Sanzari | G01L 9/0079 73/705 |

* cited by examiner

US 9,829,307 B2

SILICON BASED PRESSURE AND ACCELERATION OPTICAL INTERFEROMETRIC SENSORS WITH HOUSING ASSEMBLY

FIELD

Example implementations of the disclosed technology relate to optical interferometric sensor devices configured to measure stimuli, such as pressure and acceleration.

BACKGROUND

Extrinsic Fabry-Perot Interferometer (EFPI) sensors can be used to measure environmental phenomena such as temperature, pressure, acceleration, etc., by coupling the EFPI sensor to the desired environment. For example, a diaphragm within the sensor may be used to physically couple external pressure changes to a reflective surface of an optical fiber within the EFPI cavity. By interrogating the cavity with light, a signal may be generated that corresponds to the external pressure changes. Thus, the retrieved signals from these sensors typically correspond to optical interference fringe intensity variations corresponding to the measured phenomena as the sensor is subjected to environmental changes.

Among the challenges faced in making such measurements with an EFPI sensor is that fluctuations of other parameters in the system can result in measurement errors. For example, fluctuations in the light source intensity can affect the signal. Furthermore, spurious reflections from fusion joints in the optical fiber, changes in the index of refraction of the fiber as a function temperature, stress induced changes resulting from the expansion and contraction of the optical fiber and its mating materials as a function of temperature, mismatches in the coefficient of thermal expansion of mating materials, etc., can further influence the measurement. A need exists to reduce or eliminate measurement errors while protecting the various components of the sensors.

SUMMARY

Some or all of the above needs may be addressed by certain implementations of the disclosed technology.

The disclosed technology includes certain example implementations of optical sensors. In one example implementation, a sensor assembly is disclosed that may include a sensor diaphragm configured to deflect responsive to an applied stimulus. The sensor assembly includes a first Extrinsic Fabry-Perot Interferometer (EFPI) having a first optical cavity in communication with at least a portion of the sensor diaphragm, the first EFPI is configured to interact with light received at the first EFPI to produce a combined measurement light signal and a first common-mode light signal, the measurement light signal corresponding to the applied stimulus. The sensor assembly also includes a second EFPI having a second optical cavity, the second EFPI is configured to interact with light received at the second EFPI to produce a second common mode light signal. The sensor assembly may further include a sensing optical fiber in communication with the first EFPI; a reference optical fiber in communication with the second EFPI; and a glass header configured to support the sensing optical fiber and the reference optical fiber.

Other implementations, features, and aspects of the disclosed technology are described in detail herein and are considered a part of the claimed disclosed technology.

BRIEF DESCRIPTION OF THE FIGURES

Reference will now be made to the accompanying figures and flow diagrams, which are not necessarily drawn to scale, and wherein.

DETAILED DESCRIPTION

Certain implementations of the disclosed technology may include systems, methods and apparatus for making and using certain sensors. The disclosed embodiments include certain methods and configurations for housing interferometric optical sensors that may allow measuring a desired stimulus while rejecting, or otherwise factoring out unwanted signals. Certain embodiments of the disclosed technology may enable the reduction of measurement errors that arise, for example, due to thermal effects. Certain assembly configurations are disclosed for housing and protecting the sensors and associated components. The various implementations, features, and aspects of the disclosed technology can be understood with reference to the following detailed description, accompanying drawings, and claims.

Figure 1:
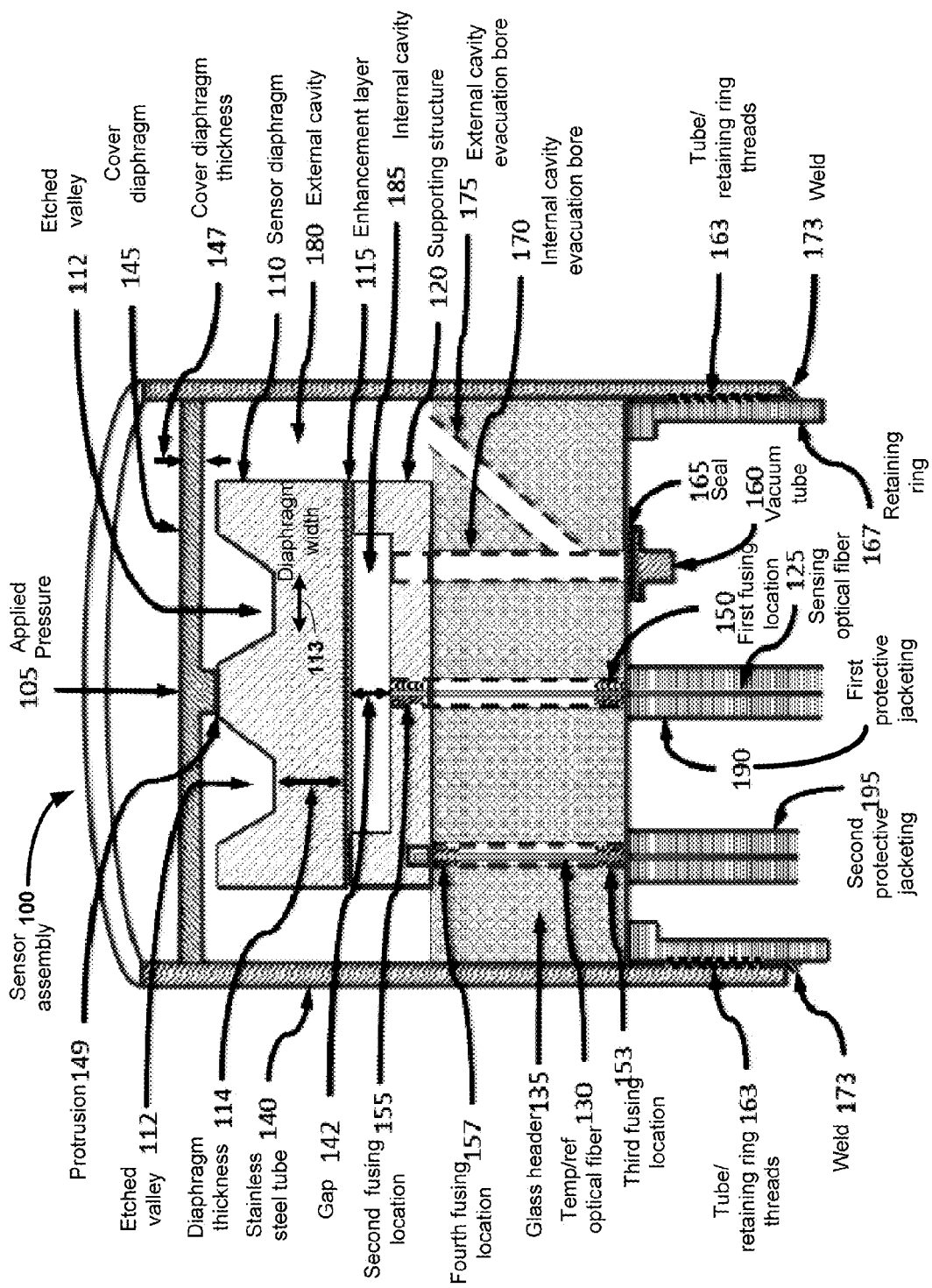
FIG. 1 is a side cross sectional cutaway illustration of a sensor assembly 100, according to an example implementation of the disclosed technology.

FIG. 1 illustrates an example embodiment of a sensor assembly 100, according to a certain implementation of the disclosed technology. In certain example implementations, the sensor assembly 100 may be adapted to measure an applied pressure 105 or acceleration (see for example FIG. 9 and the related description below). Certain disclosed embodiments of the sensor assembly 100 may include one or more optical interferometric sensors. The optical interferometric sensors, as disclosed herein, may be configured in various different embodiments, (as will be discussed further below with reference to FIGS. 8-10), for example, depending on the desired parameters and stimulus to be measured. Certain example embodiments may include components and configurations that are common to more than one embodiment variation, while other components and configurations may be utilized specifically for certain embodiments.

As depicted in FIG. 1, the disclosed sensor assembly 100 may include a sensor diaphragm 110 in communication with a supporting structure 120. In certain example implementations, the sensor diaphragm 110 may be made from silicon. In certain example implementations the sensor diaphragm 110 may be made from an intrinsic silicon (i.e., without lattice defects).

In accordance with an example implementation of the disclosed technology, pressure 105 acting on the sensor assembly 100 may be applied to a cover diaphragm 145 and transferred to the sensor diaphragm 110, which may experience deflection due to the applied pressure 105 that is transferred through the cover diaphragm 145. In certain example implementations, the cover diaphragm 145 may provide protection to the sensor diaphragm 110. In one example implementation, the cover diaphragm 145 may comprise stainless steel. In yet other example implementations, the cover diaphragm 145 may be made of other materials, including but not limited to gold, silicon, polymer, and/or various composites, as appropriate and as known to those having skill in the art.

Figure 6:
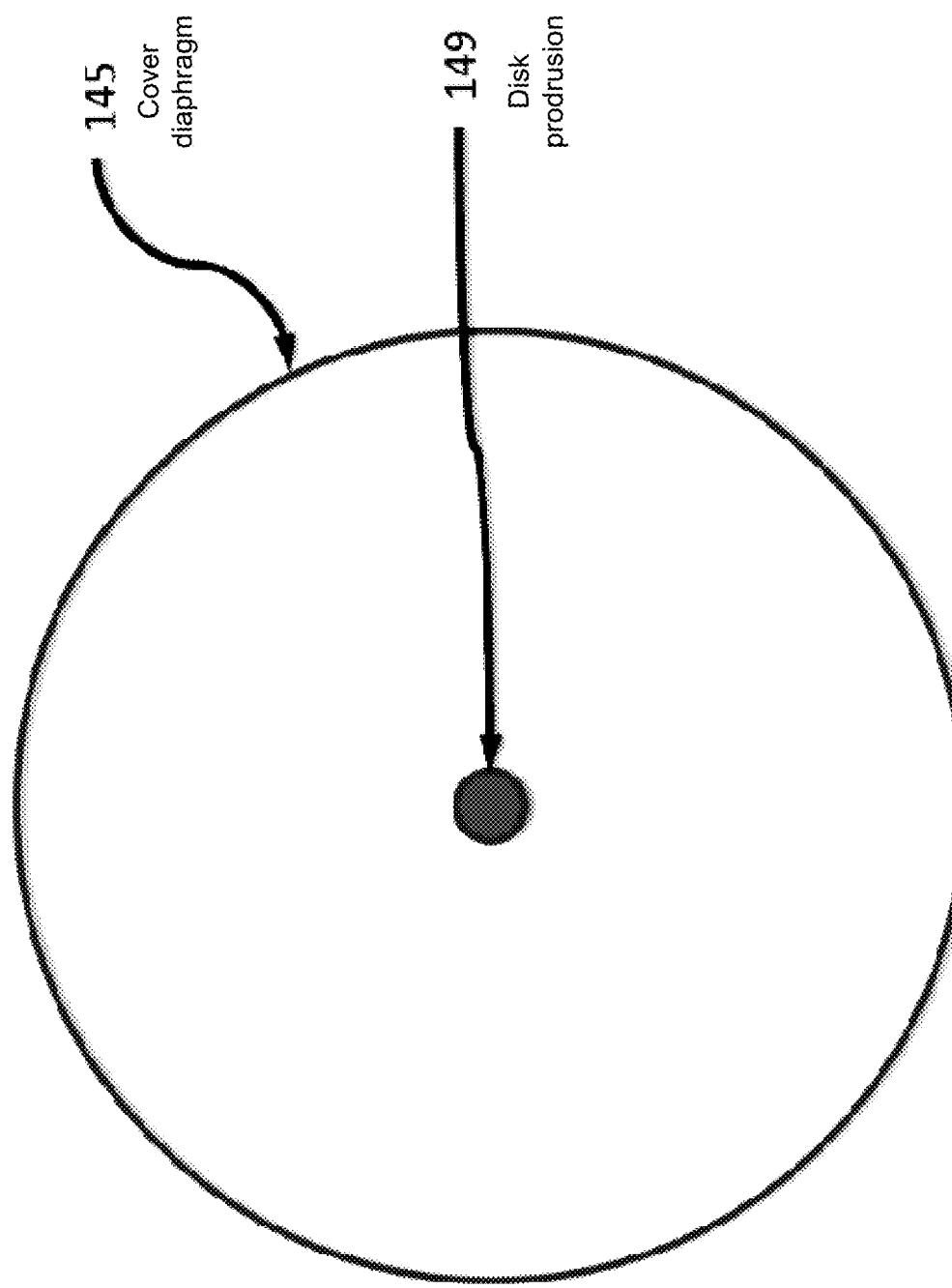
FIG. 6 is an illustration of a sensor diaphragm, according to an example implementation of the disclosed technology.

In accordance with an example implementation of the disclosed technology, the sensor diaphragm 110 may be bonded to the cover diaphragm 145 at a protrusion 149. In certain example implementations, the protrusion 149 may be disc-shaped. In certain example implementations, the protrusion 149 may be rectangular-shaped. The bending of the cover diaphragm 145, resulting from the applied pressure 105, may be transferred to the sensor diaphragm 110 via the protrusion 149 in the cover diaphragm 145. A top view illustration of the cover diaphragm 145 and the protrusion 149 is depicted in FIG. 6.

Figure 2:
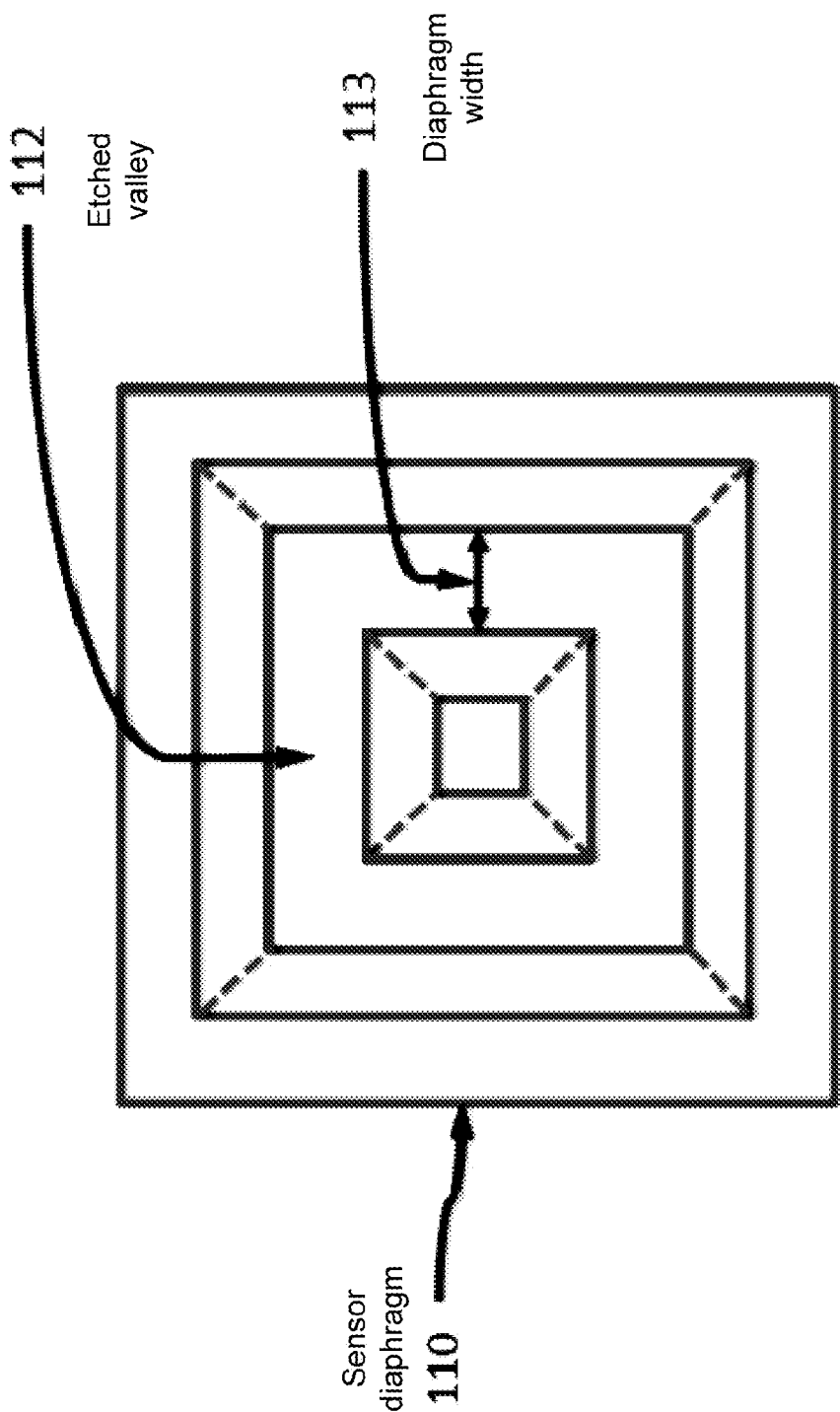
FIG. 2 is an illustration of an example square diaphragm having etched portions along each side, in accordance with an example implementation of the disclosed technology.

In certain implementations, the sensor diaphragm 110 may be square, for example, with an etched valley 112 along each side, as is shown in FIG. 2. The diaphragm thickness 114 and diaphragm width 113 of the sensor diaphragm 110, combined with the cover diaphragm 145 thickness 147 may determine the range of the applied pressure 105 that may be effectively measured by the sensor assembly 100. For optical interferometric sensors, and according to certain example embodiments disclosed herein, the total deflection of the sensor diaphragm 110 may be within a range of approximately one quarter to one eighth of the wavelength of the light used to interrogate the sensor assembly 100.

In accordance with an example implementation of the disclosed technology, the combined stiffness of the sensor diaphragm 110 and the cover diaphragm 145 may be selected or adjusted to keep the maximum deflection of the sensor diaphragm 110 within the usable range based on the applied pressure 105.

In certain example embodiments, the bottom of the sensor diaphragm 110 may be coated with an enhancement layer 115, such as silicon dioxide for example, to adjust and/or maximize the interference fringe visibility that is created by the sensing cavity, i.e., the gap 142 between the bottom surface of the sensor diaphragm 110 and a top surface of the sensing optical fiber 125. To understand the benefits associated with the enhancement layer 115, it may be instructive to consider the reflection coefficient at an interface between two materials of differing indices of refraction. The reflection coefficient r is a function of the indices of refraction ($n_1$ and $n_2$) of the two materials making up the interface and is given by:

$$r = \frac{n_1 - n_2}{n_1 + n_2} \quad (1)$$

As known to those having skill in the art of Fabry-Perot interferometers, and in keeping with the particular orientation of the sensor assembly 100 as shown in FIG. 1, interrogation light travelling in an upwards direction through the sensing optical fiber 125 may exit through the end surface of the sensing optical fiber 125 and traverse the gap 142 to the interface at the effective bottom surface of the sensor diaphragm 110. Due to the differences in refractive index between the materials of the gap 142 (which may be air) and the aforementioned surfaces, the light may reflect multiple times in the gap 142 between the effective bottom surface of the sensor diaphragm 110 and the top (exiting) surface of the sensing optical fiber 125. The gap 142 combined with the aforementioned surfaces forms the cavity of the Fabry-Perot type interferometer. Accounting for interference effects, the transmission intensity coefficient for the light passing through a Fabry-Perot cavity may be expressed as:

$$\frac{I_t}{I_i} = \frac{1}{1 + \frac{4R}{(1-R)^2}\sin^2\left(\frac{\phi}{2}\right)} \quad (2)$$

where the respective incident and transmitted beam intensities are $I_i$ and $I_t$, the cavity effective reflectivity is R, and the phase difference between the incident and reflected beams is represented by $\phi$. The reflection intensity coefficient of the light reflected back into the sensing optical fiber 125 may be expressed by:

$$\frac{I_r}{I_i} = \frac{4R\sin^2\left(\frac{\phi}{2}\right)}{(1-R)^2 + 4R\sin^2\left(\frac{\phi}{2}\right)} \quad (3)$$

Figure 3:
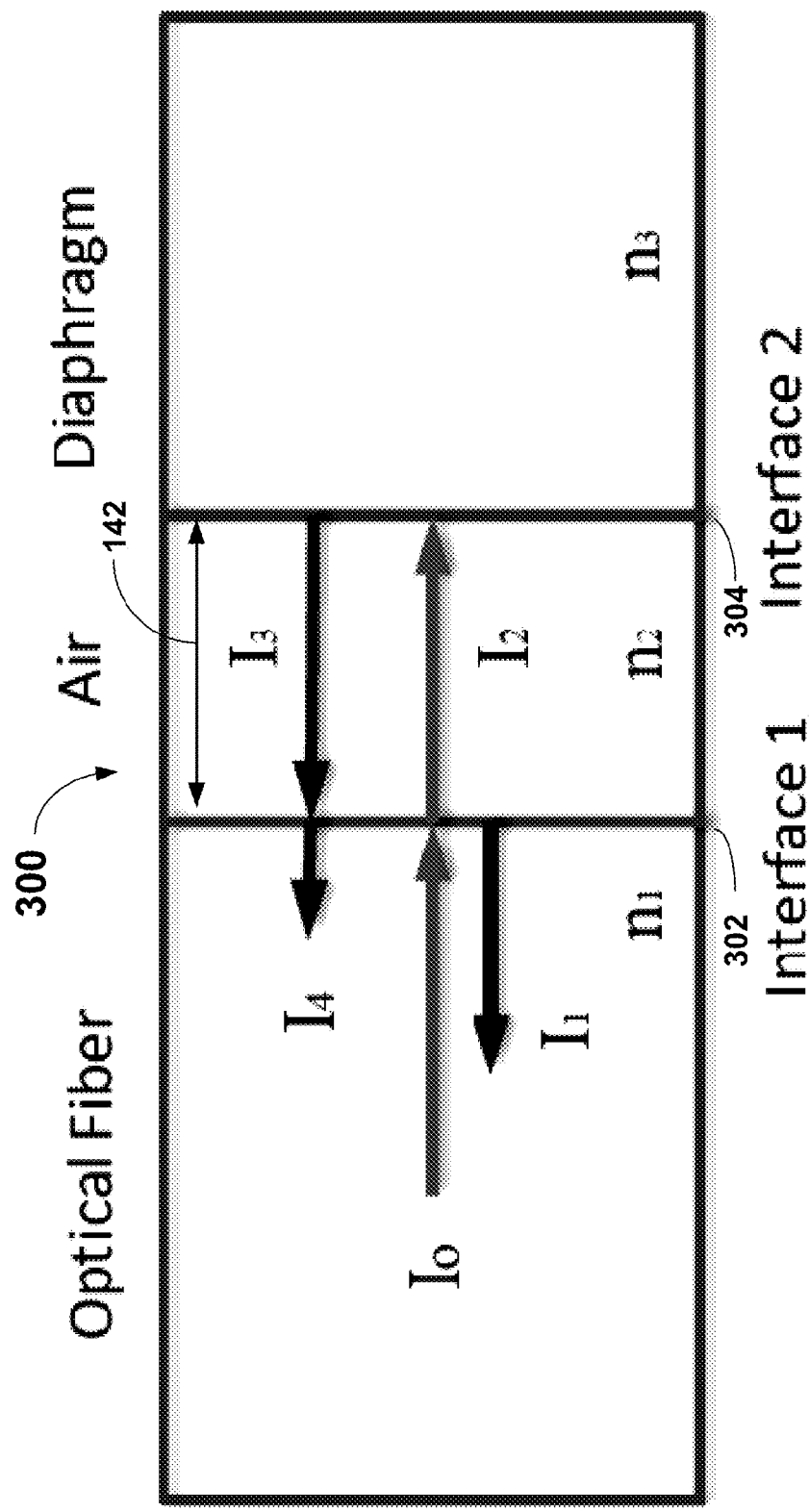
FIG. 3 is an illustration of a Fabry-Perot type interferometer cavity, in accordance with an example implementation of the disclosed technology.

FIG. 3 is an illustration of a Fabry-Perot type interferometer 300, in accordance with an example implementation of the disclosed technology. The cavity of the interferometer 300 may be formed by a first interface 302 formed at the optical fiber/air boundary and a second interface 304 formed at the air/diaphragm boundary. The (effective) indices of refraction of the optical fiber, air, and diaphragm may be designated respectively as $n_1$, $n_2$, and $n_3$. A portion of the incident light $I_0$ may reflect from the first interface 302 and this (initial) reflected portion may be expressed as $I_1$, while the portion of the incident light $I_0$ that is transmitted across the first interface 302 may be expressed as $I_2$. The portion of $I_2$ that is reflected by the second interface 304 may be expressed as $I_3$. The portion of $I_3$ that transmits back through the first interface 302 may be expressed as $I_4$.

The optical phase difference between $I_1$ and $I_4$ may be expressed as:

$$\phi = \frac{2\pi \cdot \Delta d}{\lambda} = \frac{4\pi \cdot n \cdot L}{\lambda} + \pi \qquad (4)$$

where $\lambda$ is the wavelength in air, n is the refractive index of cavity between the first interface 302 and the second interface 304 (which may comprise air with a refractive index $n=n_2=1$), and L is the Fabry-Perot cavity length measured between first interface 302 and the second interface 304.

The index of refraction of air is assumed to be 1.0 and by setting $I_1=I_4$ (to maximize fringe visibility), the relationship between the index of refractions $n_1$ and $n_3$ may be given by:

$$n_3 = \frac{n_1^2 + 4n_1 - 1}{-n_1^2 + 4n_1 + 1} \qquad (5)$$

Assuming the index of refraction of the gap 142 is $n_2=1.0$, the fiber ($S_iO_2$) is $n_1=1.46$ and the (Si) diaphragm is $n_3=3.45$, calculated index for $n_3$ with $n_1=1.46$ as given by equation (5) is $n_3=1.48$. Therefore, in order for the Airy function of the Fabry-Perot interferometer to be approximated by a harmonic function for sensor applications, the silicon diaphragm can be coated with a thin film of silicon dioxide with an index of refraction $n=1.47$, according to an example implementation of the disclosed technology.

Figure 4:
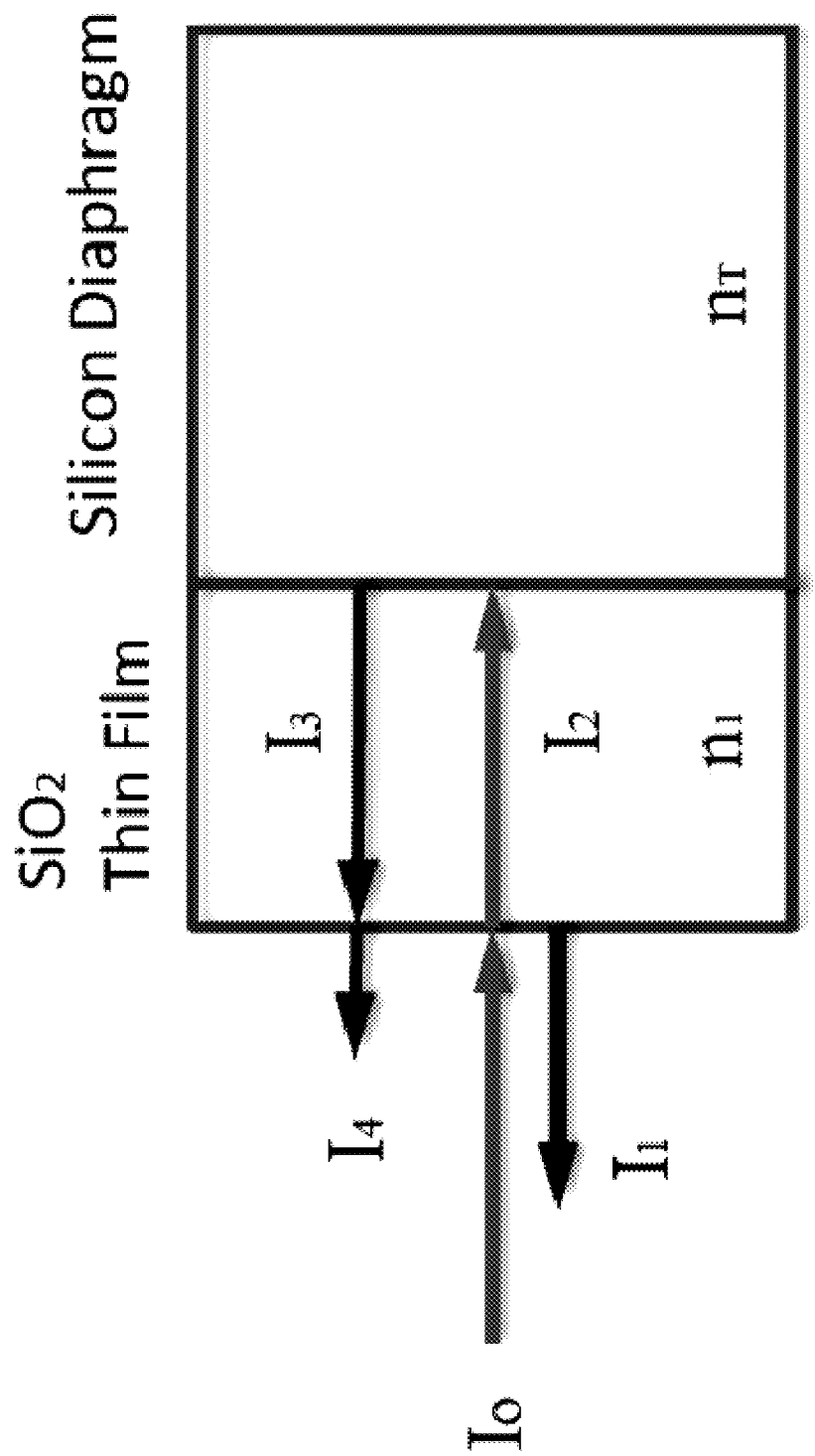
FIG. 4 is an illustration of a $SiO_2$ film on the silicon diaphragm, for altering the effective reflectivity, in accordance with an example implementation of the disclosed technology.

In addition to the reflection coefficient amplitudes at the interfaces, there may also be an interference effect resulting from $SiO_2$ films that are of greater thickness than the wavelength of light impinging on the film. These interference effects can be controlled or eliminated, according to an example implementation of the disclosed technology. FIG. 4 is an illustration of a $SiO_2$ film on the silicon diaphragm, for utilizing such effect for altering the effective reflectivity, according to an example implementation. The following equations may be utilized for determining the effects of the thin film layer. The reflection amplitude coefficient is given by:

$$r = \frac{n_1(1 - n_T)\cos(kl) - i(n_T - n_1^2)\sin(kl)}{n_1(1 + n_T)\cos(kl) - i(n_T + n_1^2)\sin(kl)} \qquad (6)$$

where $n_T$ is the index of refraction of the silicon diaphragm, $n_1$ is the index of refraction of the $SiO_2$ thin film layer, k is the wavenumber in the $SiO_2$ and l is the thickness of the film. The reflection is given by:

$$R = r \cdot r^* \qquad (7)$$

Substituting equation (6) in to (7) yields the reflection from the thin film:

$$R = \frac{n_1^2(1 - n_T)^2\cos^2(kl) + (n_T - n_1^2)^2\sin^2(kl)}{n_1^2(1 + n_T)^2\cos^2(kl) + (n_T + n_1^2)^2\sin^2(kl)} \qquad (8)$$

For a Fabry-Perot cavity, the finesse indicates how much narrower the reflection peak is compared to the free spectral range and is given by:

$$\mathcal{F}(\text{finesse}) = \frac{\pi\sqrt{R}}{1-R} = \frac{2\pi}{FWHM} \qquad (9)$$

For low reflectivities of approximately R=0.25%, the intensity of the interference pattern of the Fabry-Perot may be expressed by:

$$I = 2I_o\left(1 + \cos\left(\frac{4\pi n_2 L}{\lambda}\right)\right) \qquad (10)$$

In accordance with an example implementation of the disclosed technology, the equations above may be utilized to determine and/or optimize the various parameters for operation of the sensor assembly 100.

Figure 5:
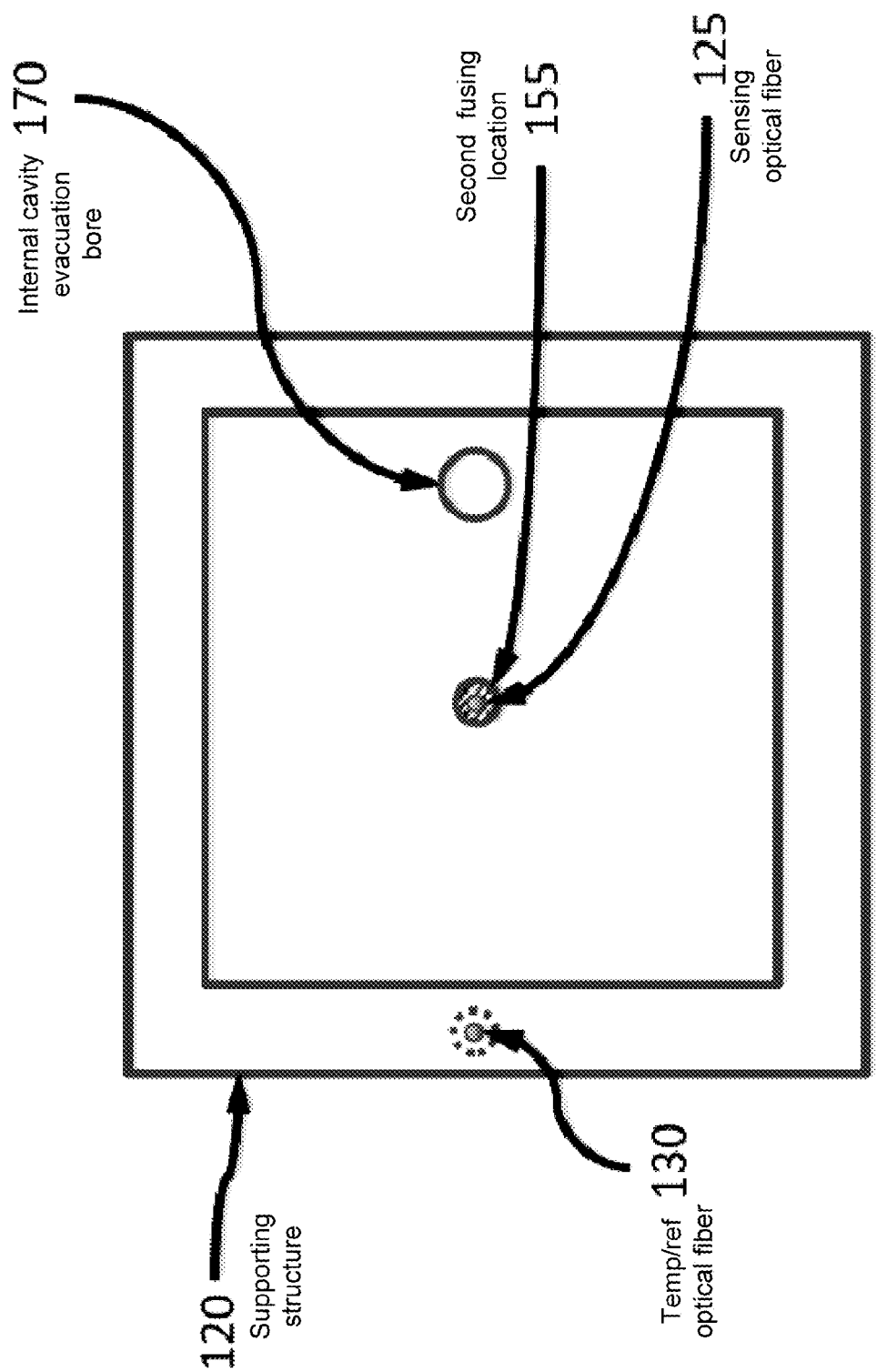
FIG. 5 is an illustration of a silicon supporting structure, which may be bonded to a diaphragm, according to an example implementation of the disclosed technology.

FIG. 5 is a top view illustration of a supporting structure 120 (also shown in FIG. 1). In certain example implementations, the supporting structure 120 may be made from silicon. In certain example implementations, the supporting structure 120 may be bonded or otherwise configured to be in intimate contact with the sensor diaphragm 110. Some of the components, as shown in FIG. 5, are also referenced in the side-cutout view of FIG. 1 for clarity. According to an example implementation of the disclosed technology, the supporting structure 120 may be etched to form the internal cavity 185. The internal cavity 185 may comprise the gap 142.

Figure 7:
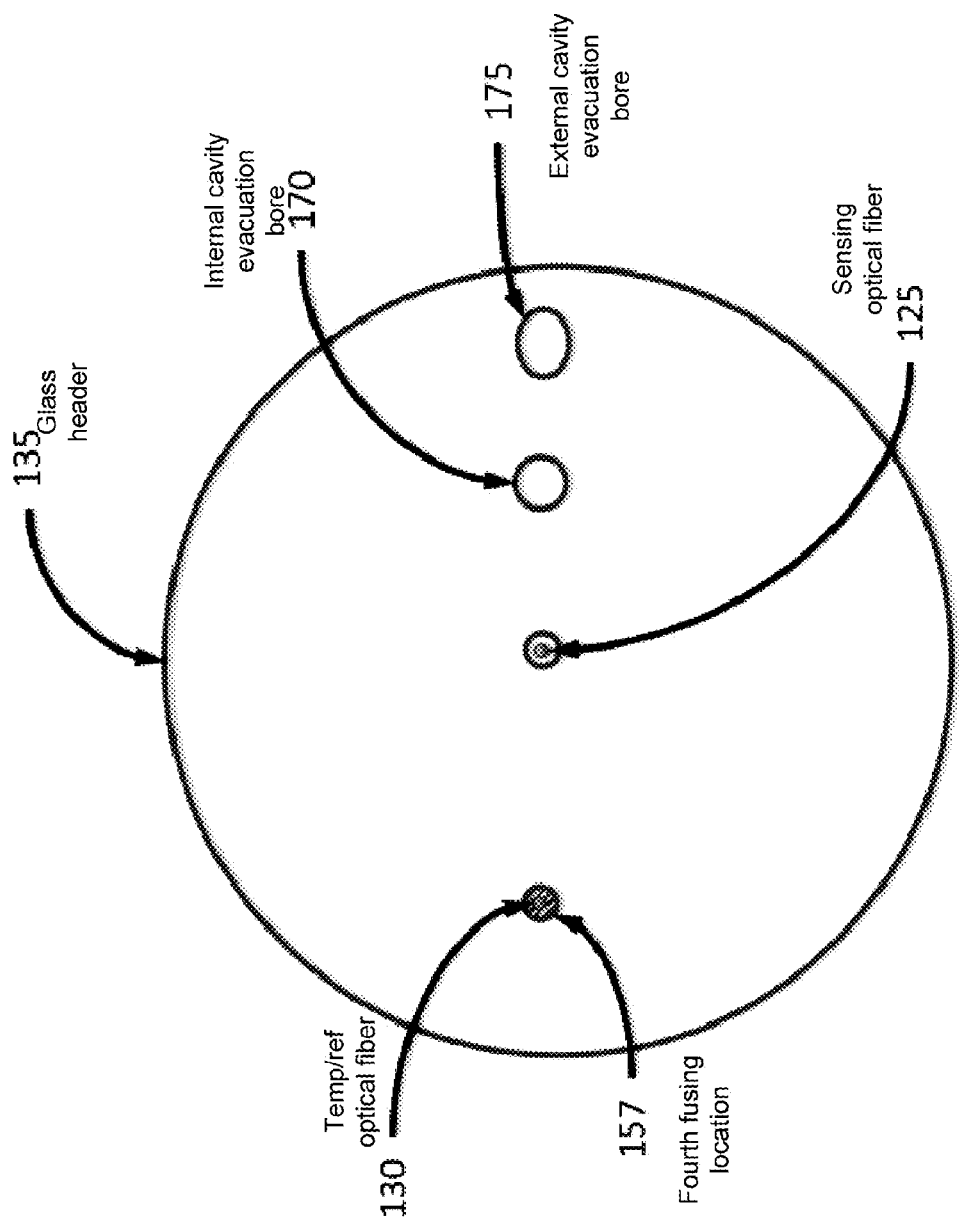
FIG. 7 is an illustration of a sensor header according to an example implementation of the disclosed technology.

In accordance with an example implementation of the disclosed technology, and with reference again to FIG. 1, the internal cavity 185 may be evacuated, for example, by attaching a vacuum pump to the vacuum tube 160 so that the internal cavity 185 and the external cavity 180 volumes can be evacuated to form a vacuum in both these regions. In an example implementation, the atmospheric gas may be evacuated through an internal cavity evacuation bore 170 and an external cavity evacuation bore 175 configured in a glass header 135. (A top view of a glass header 135 embodiment is depicted in FIG. 7). In certain example implementations, the internal cavity evacuation bore 170 and an external cavity evacuation bore 175 may be drilled in the glass header 135. In certain example implementations, the internal cavity evacuation bore 170 and an external cavity evacuation bore 175 may be in communication with each other, and in communication with the vacuum tube 160 to allow simultaneous evacuation of the cavities.

In accordance with an example implementation of the disclosed technology, the vacuum tube 160 may be attached to the glass header 135 using an indium ring compression seal 165 for applications below the 156° C. melting point of indium. In other example implementations, the seal 165 may comprise a high temperature adhesive for use higher temperature applications. In accordance with an example implementation of the disclosed technology, the seal 165 may be vacuum tight and act to bridge the differences in the thermal coefficient of expansions between the glass header 135 and the vacuum tube 160 (which in one example implementation, may be stainless steel) without breaking the vacuum seal. When a vacuum is achieved using the vacuum pump, the vacuum tube 160 may be crimped shut to form a permanent seal.

With continued reference to FIG. 1, and according to an example implementation, the sensing optical fiber 125 may be bonded to the glass header 135 (which in one example implementation may be fused silica) at a first fusing location 150. In accordance with an example implementation of the disclosed technology, the sensing optical fiber 125 may also be bonded to the (silicon) supporting structure 120 at a second fusing location 155. Likewise, and in accordance with an example implementation of the disclosed technology, the temperature/reference signal optical fiber 130 may be bonded to the glass header 135 at a third fusing location 153 and also bonded to the (silicon) supporting structure at a fourth fusing location 157. In accordance with various example implementations of the disclosed technology, one or more of the bonds can be created by a number of means including but not limited to direct bonding, anodic bonding, laser fusion bonding, glass solders and/or ceramic adhesives.

According to an example implementation of the disclosed technology, the sensing optical fiber 125 may also be bonded to the supporting structure 120 at a second fusing location 155. In certain example embodiments, the top surface of the sensing optical fiber 125 may be coplanar with the top surface of the supporting structure 120 so that light exiting top surface of the pressure sensing optical fiber 125 is substantially coplanar to the inner surface of the silicon support structure 120. In certain example implementations, these surfaces may be polished together (after installation of the sensing optical fiber 125 into the silicon support structure 120) to form a coplanar surface.

In accordance with an example implementation of the disclosed technology, the sensing optical fiber 125 and the temperature/reference optical fiber 130 may be encased in cladding material. To provide additional protection and/or strain relief, the sensing optical fiber 125 and the temperature/reference optical fiber 130 may be incased respectively in a first protective jacketing 190 and a second protective jacketing 190, for example, in the region adjacent to (and below) the glass header 135, as shown in FIG. 1. In one example implementation, the first protective jacketing 190 and a second protective jacketing 195 may comprise a common "potting" material that may backfill this area, for example, after the optical fibers are installed, and the vacuum tube 160 is crimped.

In certain example implementations, the jacketed portion of the sensing optical fiber 125 and/or the jacketed portion temperature/reference optical fiber 130 can extend several meters to a kilometer (or more) from the sensor assembly 100 for interfacing to an optical measurement system for multiple beam interferometric sensors. Since temperature may affect the optical paths of both the sensing optical fiber 125 and temperature/reference optical fiber 130, the sensor reading from the temperature/reference optical fiber 130 may be subtracted from the sensor reading that is obtained from the sensing optical fiber 125 to remove the effects of temperature and to provide an accurate pressure reading of the applied pressure 105.

Certain example embodiments of the disclosed technology may include a feature to protect the sensing optical fiber 125 during overpressure situations, where for example, the sensor diaphragm 110 may be deflected such that the length of the gap 142 is severely reduced to the point where the sensor diaphragm 110 may hit and damage the sensing optical fiber 125 if it extended passed the top (inner) surface of the support structure 120. As discussed above, and since the sensing optical fiber 125 is embedded in and co-planar with the top (inner) surface of the support structure 120, it is protected from being damaged during such an over pressure condition.

In certain example implementations, the gap 142 between the bottom of the sensor diaphragm 110 and the exit plane of the sensing optical fiber 125 may be approximately 5 microns to approximately 15 microns. According to an example implementation of the disclosed technology, this gap 142 may be adjusted so that the optical interference fringe intensity, resulting from the Fabry-Perot type mirrored cavity (and detected at the external measurement system) varies linearly with applied pressure.

In accordance with an example implementation of the disclosed technology, the sensing optical fiber 125 and temperature/reference optical fiber 130 may have their protective jackets stripped off to expose their respective claddings. In certain example implementations, the sensing optical fiber 125 and temperature/reference optical fiber 130 may then be cleaned and inserted into respective bores in the glass header 135. In certain example implementations, the sensing optical fiber 125 and temperature/reference optical fiber 130 may be bonded into the glass header 135. In certain example implementations, the sensor assembly 100 may be assembled by placing the sensor diaphragm 110, the supporting structure 120, and the glass header 135 into the stainless steel tube 140. In accordance with an example implementation of the disclosed technology, the stainless steel tube 140 may be supported by a retaining ring 167. In an example implementation, the tube 140 may include threads 163 on its inside surface and the retaining ring 167 may include corresponding threads 163 on its outside surface for mating with the tube 140. In certain example implementations, the retaining ring 167 may be threaded into the tube 140 to provide a preload between the sensor diaphragm 120 and the cover diaphragm 145 at the interface of the protrusion 149. This also allows for adjusting the gap 142 length of the Fabry-Perot interferometer. In accordance with an example implementation of the disclosed technology, the proper gap 142 length can be found by connecting the optical fiber to an optical spectrometer and adjusting the gap so that linear portion of the interference signal is being read by the detection system. Upon completion of the adjustment and calibration, the retaining ring 167 may be secured to the tube 140, for example, by a weld 173 or adhesive.

Figure 8:
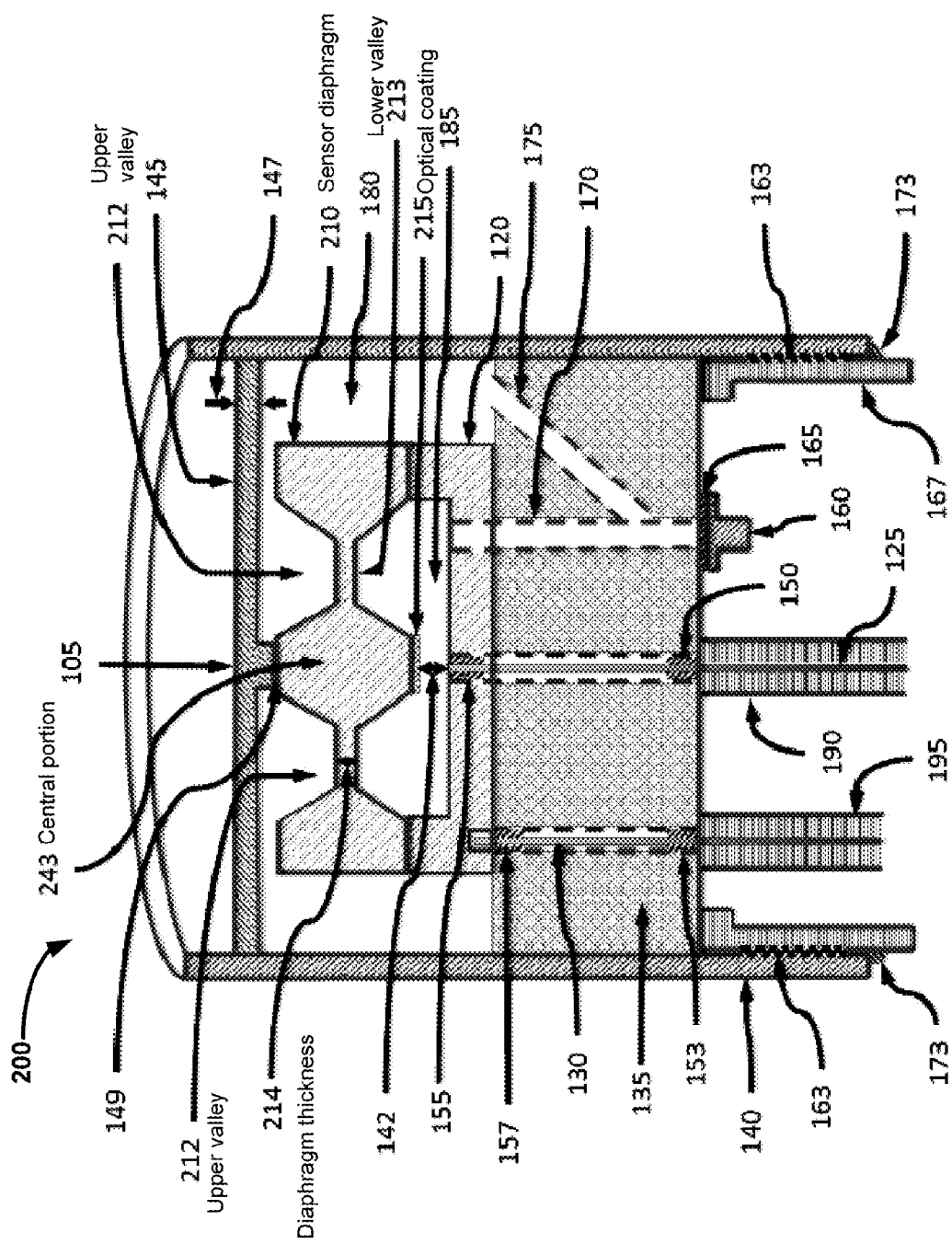
FIG. 8 is a side cross sectional cutaway illustration of a sensor assembly 800 with another diaphragm embodiment, according to an example implementation of the disclosed technology.

FIG. 8 is a side cross sectional cutaway illustration of an another sensor assembly 200 having a different diaphragm shape and arrangement, according to an example implementation of the disclosed technology. In this figure, elements that differ from those described above with reference to FIG. 1 are labeled with corresponding element names.

In this example implantation, the silicon supporting structure 120 may bonded to the sensor diaphragm 210, which in certain example implantations, may comprise silicon. In this example implementation, the sensor diaphragm 210 may include an upper valley 212 and a lower valley 213 etched into the sensor diaphragm 210 material. In an example implementation, the top central portion of the sensor diaphragm 210 may be attached to the center of the (stainless steel) cover diaphragm 145 at the protrusion 149. As discussed with reference to FIG. 1, the applied pressure 105 deflects the cover diaphragm 145, and in turn, deflects the central portion 243 of the sensor diaphragm 210. In certain example implementations, the sensor diaphragm 210 is configured to deflect straight up and down in response to a changing applied pressure 105. In an example implementation, the bottom of the sensor diaphragm 210 may include an optical coating 215 that remains flat during the full range of deflection to reduce angular scatter of the diverging light beam impinging on the sensor diaphragm 210 from the sensing optical fiber 125. In certain example implementations, the resistance to deflection and the natural frequency of the structure may be controlled by varying the diaphragm thickness 214 and the cover thickness 147. According to an example implementation of the disclosed technology, the double etched sides (upper valley 212 and lower valley 213) may create a more flexible sensor diaphragm 210 and provide a flat surface for the cavity wall of the Fabry-Perot. The rest of the structure and the assembly process are as described in FIG. 1.

Figure 9:
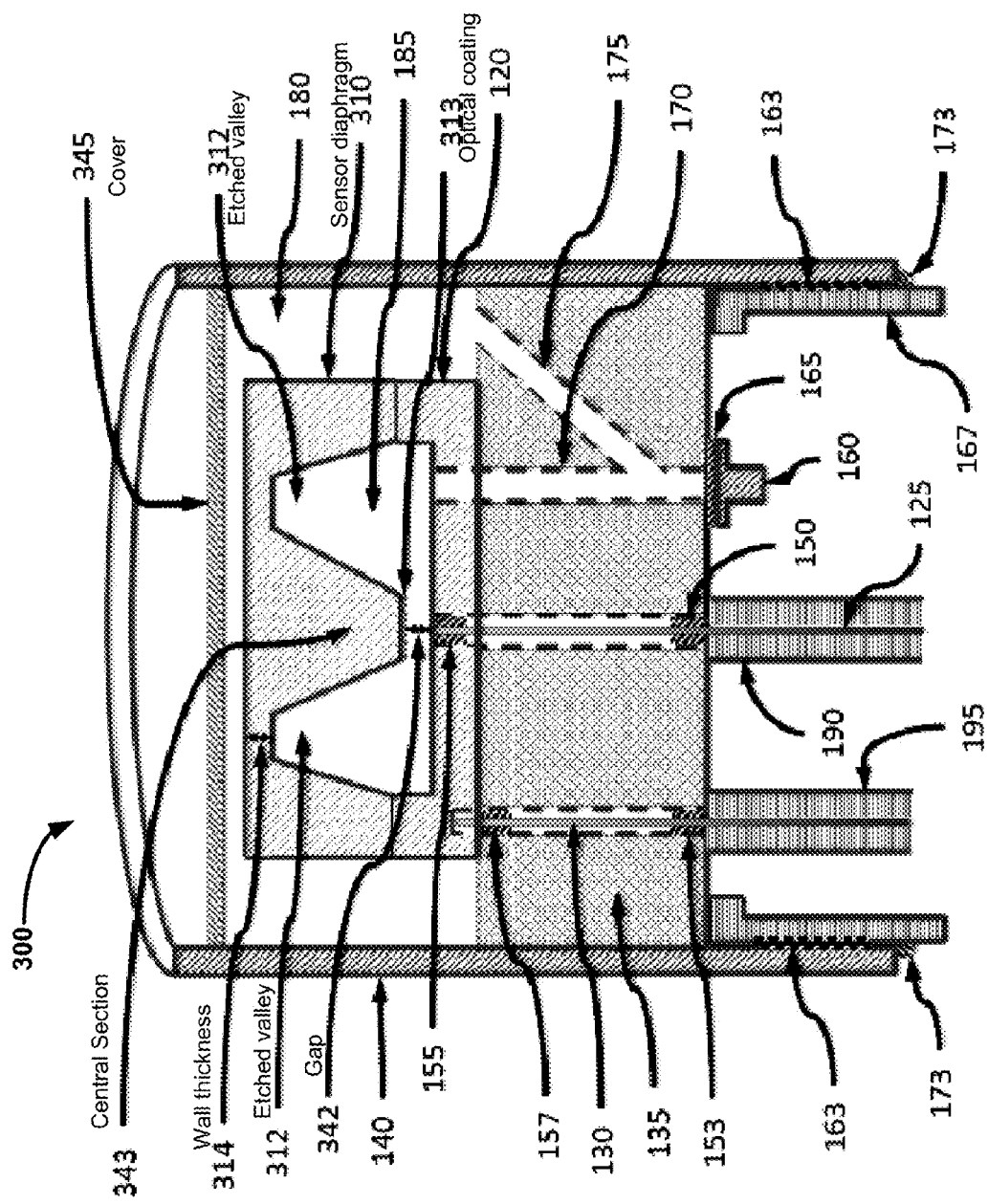
FIG. 9 is a side cross sectional cutaway illustration of a sensor assembly 300 with another diaphragm embodiment, according to an example implementation of the disclosed technology, in which the sensor may be suitable for use as an accelerometer

FIG. 9 is a cross sectional cutaway illustration of an example implementation of a sensor assembly 300 having a different sensor diaphragm 310 embodiment (as compared with the previously described sensor diaphragms. Certain example implementations of this sensor assembly 300 may be suitable for use as an accelerometer. For example, in this embodiment, the cover 345 may be configured without a protrusion so that the cover 345 does not contact the sensor diaphragm (compared to the cover diaphragm protrusion 149 that is configured to contact the sensor diaphragm, as shown in FIGS. 1 and 8).

In accordance with an example implementation of the disclosed technology, the supporting structure 120 may be bonded to the sensor diaphragm 310, as previously discussed. In an example implementation, the sensor diaphragm 310 may be configured with a deeper etched valley 312 (for example, in comparison with the previously described sensor diaphragms 110 210). In certain example implementations, the deeper etch associated with the etched valleys 312 may result in a larger central section 343 of the sensor diaphragm 310, which may act as a proof mass for detecting acceleration with the sensor assembly 300. In this example implementation, by omitting the protrusion from the cover 345, the central portion 343 of the sensor diaphragm 310 can move freely.

In accordance with an example implementation of the disclosed technology, the mass deflection experienced during acceleration of the sensor diaphragm 310 may be adjusted by changing a thickness 314 of one or more portions of the sensor diaphragm 310, for example, as depicted in FIG. 9. In certain example implementations, the mass deflection experienced during acceleration of the sensor diaphragm 310 may be also be configured by varying the width of one or more portions of the etched valleys 312 of the sensor diaphragm 310.

In accordance with an example implementation of the disclosed technology, the resonant frequency of the sensor assembly 300 may be controlled by one or more of: the dimensions of the thickness 314, the width of one or more portions of the etched valleys 302, the proof mass 343 of the sensor diaphragm 310, and/or the material properties of the various structures associated with the sensor assembly 300.

As previously discussed herein with reference to other example implementations, a bottom portion of the central section 343 of the sensor diaphragm may be flat and coated with an optical coating 313. In certain example implementations, the gap 342 associated with the cavity of the Fabry-Perot interferometer may be adjusted during assembly to maximize fringe visibility and signal output linearity. The rest of the structure and assembly process may be as described above with reference to the other sensor assembly 100 embodiments.

In accordance with an example implementation of the disclosed technology, the sensor assembly 200 and its associated sensor diaphragm 210, as shown in FIG. 8 can also be used as an accelerometer by removing the protrusion 149 from the cover diaphragm 145 so that the central portion 243 of the sensor diaphragm 210 can move freely. In this manner, and since the sensor diaphragm 210 is etched on both sides (i.e., the upper valley 212 and the lower valley 213), the central portion 243 of the diaphragm 243 may respond to accelerations along the vertical axis. Etching from both sides 212 213 may produce a larger central portion 243 which acts as the proof mass for detecting acceleration with the sensor assembly 200.

In accordance with an example implementation of the disclosed technology, the mass deflection experienced during acceleration of the sensor diaphragm 210 may be adjusted by changing a thickness 214 of one or more portions of sensor diaphragm 210. In certain example implementations, the mass deflection experienced during acceleration of the sensor diaphragm 210 may be also be configured by varying the width of one or more portions of the etched valleys 212, 213 of the sensor diaphragm 210.

As discussed with reference to FIG. 9, resonant frequency of the sensor assembly 200 may be adjusted by controlling by one or more of: the dimensions of the diaphragm thickness 214, the width of one or more portions of the etched valleys 212 213, the proof mass of the sensor diaphragm 210, and/or the material properties of the various structures associated with the sensor assembly 200.

As previously discussed herein with reference to other example implementations, a bottom portion of the central portion 243 of the sensor diaphragm 210 may be flat and coated with an optical coating 215. In certain example implementations, the gap 142 associated with the cavity of the Fabry-Perot interferometer may be adjusted during assembly to maximize fringe visibility and signal output linearity. The rest of the structure and assembly process may be as described above with reference to the other sensor assembly 100 embodiments.

The geometrical differences produced by the varied etching in diaphragms 210 and 310 may provide for a range of acceleration sensitivities and natural resonant frequencies resulting in a wider variety of acceleration applications that these sensors can perform.

Figure 10:
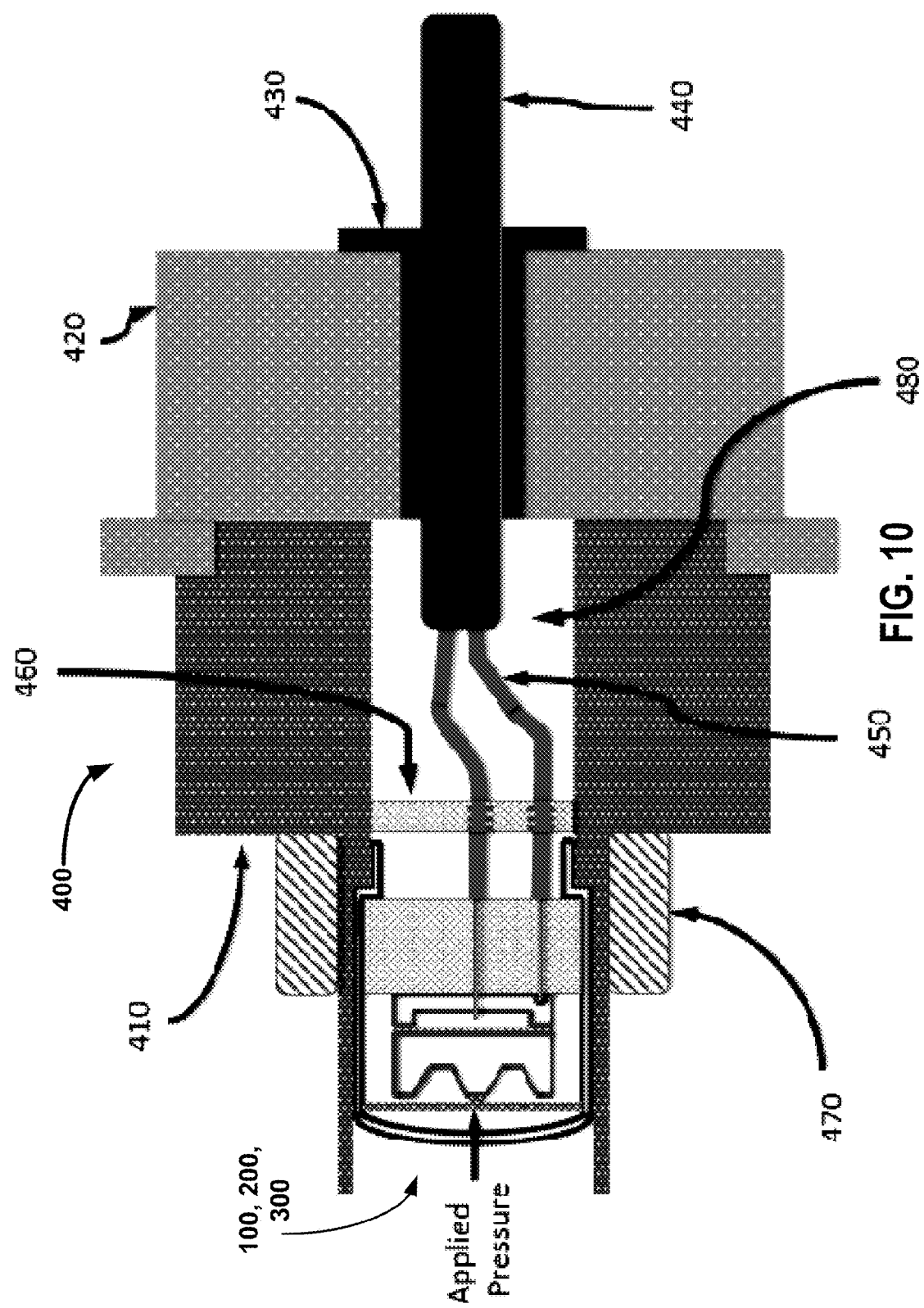
FIG. 10 is a side-cutaway illustrative depiction of a casing 400 for housing a sensor assembly 100 200 300, according to an example implementation of the disclosed technology.

In accordance with certain example implementations, and as depicted in FIG. 10, one or more of the previously described sensors 100, 200, 300, may be configured to be mountable in a casing 400. According to an example implementation of the disclosed technology, the casing 400 may comprise stainless steel or other suitable materials. In certain example implementations, a portion of the casing 400 may include threads 470 for interfacing with the sensor assembly 100, 200, or 300. In accordance with an example implementation of the disclosed technology, the casing 400 may include a screw housing 410 for interfacing with the sensor assembly 100, 200, or 300. In certain example implementations, the screw housing 410 may be threaded 470 for mounting at a pressure port.

Certain example implementations may include a strain relief and support 460, for example, to further secure and support the cladded optical fibers 450. During assembly, and according to an example implementation, the sensor assembly 100, 200, or 300 may be mounted to the screw housing 410 while maintaining a vacuum to ensure that air in the cavity 480 is evacuated.

In certain example implementations, the casing 400 may include an optical fiber cable relief 420 connected to the screw housing 410. In certain example implementations, the optical fibers 450 may be encased and protected by a furcation tubing 440, which may pass through a crimp ring 430 that may be attached to the cable relief housing 420. In accordance with an example implementation of the disclosed technology, resulting fiber cable can extend from the casing 400 to an optical measurement system, associated couplers, and light sources, such as described one described in the incorporated references.

In accordance with an example implementation of the disclosed technology, one or more of the previously described sensors 100, 200, 300 may be constructed without the cover diaphragms 145, 345. In such example configuration, one or more of the associated internal cavity evacuation bore 170 and/or the external cavity evacuation bore 175 may be omitted (not drilled). In certain example implementations, the external cavity evacuation bore 175 may be omitted and the internal diaphragm pressure may be controlled via the internal cavity evacuation bore 170, which may be sealed at the vacuum tube 160.

Certain example implementations of the disclosed technology discussed herein may address some of the challenges encountered in using the Fabry-Perot interferometer sensors. Such challenges include the presence of unwanted signal fluctuations due to various parameters associated with the system and the measurement environment. For example, signal errors from unwanted fluctuations can stem from variations in the intensity (and/or wavelength) of the system's light source(s), spurious reflections (for example, from fusion splice joints in optical fibers), changes in the index of refraction of the optical fiber as a function temperature, stress induced changes resulting from the expansion and contraction of the optical fiber and its mating materials as a function of temperature, mismatches in the coefficient of thermal expansion of mating materials, etc. Such fluctuations can cause errors in the measurement signals. Certain example implementations of the disclosed technology may enable the reduction or elimination such unwanted fluctuations.

As may be apparent to one having skill in the art, and as depicted in at least FIG. 1, FIG. 5, and FIGS. 8-10, example implementations of the disclosed technology can include two extrinsic Fabry-Perot interferometer-type sensors within the same sensor housing. In accordance with an example implementation of the disclosed technology, one of the sensors may be utilized to measure desired stimuli, such as pressure, acceleration, etc., and may be affected by thermal effects, as described above. The other sensor may be at least partially isolated from the desired stimuli, while also being affected by the thermal effects. In accordance with certain example implementations, the optical light source and measurement system coupled with the sensors may be configured to subtract certain signals as measured by the second (isolated) sensor from the signal produced by first sensor to reduce or eliminate the thermal effects present at the first sensor.

In accordance with certain example implementations of the disclosed technology, and in reference again to FIG. 1, the sensing optical fiber 125 may direct light to/from the first Fabry-Perot Interferometer cavity such that deflections in the sensor diaphragm 110 affect the gap 142 or cavity length that is situated towards the middle portion of the internal cavity where deflection due to the applied pressure 105 may be enhanced. Conversely, the temperature/reference optical fiber 130 may direct light to/from the second Fabry-Perot Interferometer cavity defined in the supporting structure 120 such that deflections in the sensor diaphragm 110 do not affect the cavity associated with this second Fabry-Perot Interferometer. This concept is also illustrated in FIG. 5, where the temperature/reference optical fiber 130 may direct light to/from the second Fabry-Perot Interferometer cavity at or near the perimeter of the supporting structure 120 (where deflections in the sensor diaphragm do not appreciably affect the associated optical cavity length) whereas the sensing optical fiber 125 may direct light to/from a central portion of support structure in which the Fabry-Perot Interferometer where its associated optical cavity length are affected by the deflection in the sensor diaphragm.

As discussed above, the disclosed technology includes certain example implementations of interferometric optical sensors. In one example implementation, a sensor assembly is disclosed that may include a sensor diaphragm configured to deflect responsive to an applied stimulus. The sensor assembly includes a first Extrinsic Fabry-Perot Interferometer (EFPI) having a first optical cavity in communication with at least a portion of the sensor diaphragm, the first EFPI is configured to interact with light received at the first EFPI to produce a combined measurement light signal and a first common-mode light signal, the measurement light signal corresponding to the applied stimulus. The sensor assembly also includes a second EFPI having a second optical cavity, the second EFPI is configured to interact with light received at the second EFPI to produce a second common mode light signal. The sensor assembly may further include a sensing optical fiber in communication with the first EFPI; a reference optical fiber in communication with the second EFPI; and a glass header configured to support the sensing optical fiber and the reference optical fiber. According to an example implementation of the disclosed technology, the applied stimulus can include one or more of pressure and acceleration. In certain example implementations, one or more of the first EFPI and the second EFPI are configured to receive light from corresponding external light sources.

In certain example implementations, the reference optical fiber may be configured to provide a second interrogation light to the second EFPI, and wherein the reference optical fiber is further configured to output the second common mode light signal. In certain example implementations, the second common mode light signal is utilized to produce a compensated pressure signal by subtracting common-mode errors in the combined measurement light signal and first common-mode light signal.

According to an example implementation of the disclosed technology, the sensor diaphragm can include a central deflection region. In certain example implementations, the sensor diaphragm may be in communication and supported by a supporting structure in at least a portion of a periphery of the sensor diaphragm.

In certain example implementations, the sensor diaphragm can include a surface having a deposited oxide layer, for example, for communication with the optical cavity. The oxide layer may be configured to alter a reflectivity associated with at least a portion of the sensor diaphragm that is in communication with the first optical cavity of the first EFPI.

In certain example implementations, the second optical cavity associated with the second EFPI is at least partially mechanically isolated from the sensor diaphragm, while the second EFPI is at least partially thermally coupled to the first EFPI.

In certain example implementations, the first EFPI is positioned in a first region of the sensor assembly having a first temperature, and the second EFPI is positioned in a second region of the sensor assembly having a temperature substantially equal to the first temperature. According to an example implementation of the disclosed technology, the first EFPI is adapted to measure a first pressure stimulus. In an example implementation, the second EFPI is isolated from external pressure sources.

Certain example implementation of the disclosed technology may include a sealable evacuation bore extending through the glass header, the sealable evacuation bore in communication with a least a portion of the first optical cavity. In certain example implementations, the sealable evacuation bore may be communication with a third cavity portion of the sensor assembly, wherein the third cavity portion is in communication with the sensor diaphragm but external to the first optical cavity.

According to an example implementation of the disclosed technology, the sensor assembly may include a supporting structure in communication with the glass header and the sensor diaphragm, the supporting structure may be configured for supporting the sensor diaphragm. The supporting structure may be further configured for securing at least a portion of the sensing optical fiber.

In certain example implementations, the cover associated with the sensor assembly can be in mechanical communication with at least a portion of the sensor diaphragm, for example, by a protrusion, etc. In certain example implementations, the cover may be configured for deflection responsive to applied pressure to transfer the deflection to the sensor diaphragm.

In another example implementation, the cover may be mechanically isolated from the sensor diaphragm, so that the sensor diaphragm may deflect responsive to an acceleration of the sensor assembly, for example, so that any applied pressure to the cover is not transferred to the diaphragm.

Certain example implementations may include a sensor housing, which in some implementations may include the cover. In an example implementation, the sensor housing may be configured to mate with and secure at least a portion of the glass header.

In an example implementation, the sensor assembly may include a casing for interfacing with a sensor assembly. In one example implementation, the casing can include a threaded screw housing configured for mounting the sensor assembly, for example to a measurement port or other suitable location for the environment to be measured. In one example implementation, the casing may include one or more strain reliefs configured for securing one or more of the sensing and reference optical fibers.

In accordance with an example implementation of the disclosed technology, the sensing optical fiber in communication with the first EFPI may be configured for communicating the combined measurement light signal and the first common-mode light signal to a first optical detector.

In an example implementation, the reference optical fiber in communication with the second EFPI may be configured for communicating the second common mode signal to a second optical detector.

According to an example implementation of the disclosed technology, the sensing optical fiber in communication with the first EFPI may be configured for providing interrogation light from a first light source to the first EFPI. In certain example implementations, the reference optical fiber in communication with the second EFPI may be configured for providing interrogation light from a second light source to the second EFPI.

The disclosed technology can include a sensor system that can include a first light source configured to provide first interrogation light and a second light source configured to provide second interrogation light. The sensor system may include a sensor assembly that includes one or more of: a sensor diaphragm configured to deflect responsive to an applied stimulus; a first Extrinsic Fabry-Perot Interferometer (EFPI) coupled with the first light source and having a first optical cavity in communication with at least a portion of the sensor diaphragm, the first EFPI is configured to interact with the first interrogation light to produce a combined measurement light signal and a first common-mode light signal, the measurement light signal corresponding to the applied stimulus. In certain example implementations, the applied stimulus can include one or more of pressure and acceleration. The sensor system may include a second EFPI coupled with the second light source and having a second optical cavity, the second EFPI may be configured to interact with the second interrogation light to produce a second common mode light signal.

Certain example implementations of the sensor system may include a first optical detector configured to detect the combined measurement light signal and first common-mode light signal and to produce a combined measurement electrical signal; a second optical detector configured to detect the second common mode signal and to produce a second common mode electrical signal; and a microprocessor in communication with the first optical detector and the second optical detector, the microprocessor configured to output a compensated measurement signal corresponding to a difference between the combined measurement electrical signal and the second common mode signal.

In certain example implementations, the sensing optical fiber may be configured to provide a first interrogation light to the first EFPI. In certain example implementations, the sensing optical fiber may be configured to output the combined measurement light signal and first common-mode light signal.

In certain example implementations, the sensor system can include a casing for interfacing with a sensor assembly. In one example implementation, the casing can include a threaded screw housing configured for mounting the sensor system to a measurement port. In an example implementation, the casing can include one or more strain reliefs configured for securing one or more of the sensing and reference optical fibers.

In certain example implementations, the sensor diaphragm includes a central deflection region, and the sensor diaphragm is in communication and supported by a supporting structure in at least a portion of a periphery of the sensor diaphragm.

As discussed previously, the second optical cavity associated with the second EFPI is at least partially mechanically isolated from the sensor diaphragm. In certain example implementations, the second EFPI is at least partially thermally coupled to the first EFPI.

In certain example implementations, the sensor system may include a sealable evacuation bore in communication with a least a portion of the first optical cavity.

In an example implementation, the sensor system can include a cover in mechanical communication with at least a portion of the sensor diaphragm. The cover may be configured for deflection responsive to applied pressure to transfer the deflection to the sensor diaphragm.

In another example implementation, the cover may be mechanically isolated from the sensor diaphragm to allow the sensor diaphragm to deflect responsive to an acceleration of the sensor assembly.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A sensor assembly, comprising:
   a sensor diaphragm configured to deflect responsive to an applied stimulus;
   a first Extrinsic Fabry-Perot Interferometer (EFPI) having a first optical cavity, defined by a gap, in communication with at least a portion of the sensor diaphragm, the first EFPI is configured to interact with light received at the first EFPI to produce a combined measurement light signal and a first common-mode light signal, the measurement light signal corresponding to the applied stimulus;
   a second EFPI having a second optical cavity in communication with a cavity that extends partially through a supporting structure, the second EFPI is configured to interact with light received at the second EFPI to produce a second common mode light signal;
   a sensing optical fiber in communication with the first EFPI;
   a reference optical fiber in communication with the second EFPI; and
   a glass header configured to support the sensing optical fiber and the reference optical fiber.

2. The sensor assembly of claim 1, wherein the sensing optical fiber is configured to provide a first interrogation light to the first EFPI, and wherein the sensing optical fiber is further configured to output the combined measurement light signal and first common-mode light signal.

3. The sensor assembly of claim 1, wherein the reference optical fiber is configured to provide a second interrogation light to the second EFPI, and wherein the reference optical fiber is further configured to output the second common mode light signal.

4. The sensor assembly of claim 1, wherein the second common mode light signal is utilized to produce a compensated pressure signal by subtracting common-mode errors in the combined measurement light signal and first common-mode light signal.

5. The sensor assembly of claim 1, wherein the sensor diaphragm comprises a central deflection region, and wherein the sensor diaphragm is in communication and supported by the supporting structure in at least a portion of a periphery of the sensor diaphragm.

6. The sensor assembly of claim 1, wherein the sensor diaphragm comprises an oxide layer in communication with the optical cavity, wherein the oxide layer is configured to alter a reflectivity associated with at least a portion of the sensor diaphragm that is in communication with the first optical cavity of the first EFPI.

7. The sensor assembly of claim 1, wherein the first EFPI is positioned in a first region having a first temperature, the first EFPI is adapted to measure a first pressure stimulus, and wherein the second EFPI is positioned in a second region defined within the supporting structure and without requiring communication with an internal cavity associated with the gap, the second region having a temperature substantially equal to the first temperature, and the second EFPI is isolated from external pressure sources.

8. The sensor assembly of claim 1, wherein the applied stimulus comprises one or more of pressure and acceleration.

9. The sensor assembly of claim 1, wherein the first EFPI and the second EFPI are configured to receive light from an external light source.

10. The sensor assembly of claim 1, further comprising a sealable evacuation bore extending through the glass header, the sealable evacuation bore in communication with a least a portion of the first optical cavity.

11. The sensor assembly of claim 10, wherein the sealable evacuation bore is further in communication with a third cavity portion of the sensor assembly, wherein the third cavity portion is in communication with the sensor diaphragm but external to the first optical cavity.

12. The sensor assembly of claim 1, wherein the supporting structure is in communication with the glass header and the sensor diaphragm, the supporting structure configured for supporting the sensor diaphragm, the supporting structure further configured for securing at least a portion of the sensing optical fiber.

13. The sensor assembly of claim 1, further comprising a sensor housing, the sensor housing comprising a cover, wherein the cover comprises a protrusion in mechanical communication with at least a portion of the sensor diaphragm, and wherein the cover is configured for deflection responsive to applied pressure, and wherein the cover is configured to transfer the deflection to the sensor diaphragm.

14. The sensor assembly of claim 1, further comprising a sensor housing, the sensor housing comprising a cover, wherein the cover is mechanically isolated from the sensor diaphragm, and wherein the sensor diaphragm is configured to deflect responsive to an acceleration of the sensor assembly.

15. The sensor assembly of claim 1, further comprising a sensor housing, the sensor housing comprising a cover, and wherein the sensor housing is configured to mate with and secure at least a portion of the glass header.

16. The sensor assembly of claim 1, further comprising a casing, the casing comprising:
   a threaded screw housing configured for mounting the sensor assembly to a measurement port; and one or more strain reliefs configured for securing one or more of the sensing and reference optical fibers.

17. The sensor assembly of claim 1, wherein the sensing optical fiber in communication with the first EFPI is configured for communicating the combined measurement light signal and the first common-mode light signal to a first optical detector.

18. The sensor assembly of claim 1, wherein the reference optical fiber in communication with the second EFPI is configured for communicating the second common mode signal to a second optical detector.

19. The sensor assembly of claim 1, wherein the sensing optical fiber in communication with the first EFPI is configured for providing interrogation light from a first light source to the first EFPI.

20. The sensor assembly of claim 1, wherein the reference optical fiber in communication with the second EFPI is configured for providing interrogation light from a second light source to the second EFPI.

\* \* \* \* \*